United States Patent
Inaida et al.

(10) Patent No.: US 8,600,396 B2
(45) Date of Patent: Dec. 3, 2013

(54) RADIO SCHEDULING APPARATUS, RADIO COMMUNICATION SYSTEM, AND RADIO SCHEDULING METHOD

(75) Inventors: Yusuke Inaida, Tokyo (JP); Tomohiro Kikuma, Tokyo (JP)

(73) Assignee: NEC Corporation, Tokyo (JP)

( * ) Notice: Subject to any disclaimer, the term of this patent is extended or adjusted under 35 U.S.C. 154(b) by 517 days.

(21) Appl. No.: 12/811,865

(22) PCT Filed: Dec. 12, 2008

(86) PCT No.: PCT/JP2008/072623
§ 371 (c)(1),
(2), (4) Date: Jul. 7, 2010

(87) PCT Pub. No.: WO2009/098821
PCT Pub. Date: Aug. 13, 2009

(65) Prior Publication Data
US 2010/0291959 A1    Nov. 18, 2010

(30) Foreign Application Priority Data

Feb. 8, 2008   (JP) .................... 2008-029005

(51) Int. Cl.
*H04W 72/00* (2009.01)
(52) U.S. Cl.
USPC ............. 455/452.2; 455/450; 455/452.1; 455/509; 455/513; 370/329
(58) Field of Classification Search
USPC ........... 455/450–453, 509, 512, 513; 370/329
See application file for complete search history.

(56) References Cited

U.S. PATENT DOCUMENTS

| | | | |
|---|---|---|---|
| 7,899,015 B2* | 3/2011 | Bottomley et al. | 370/335 |
| 2008/0076434 A1* | 3/2008 | Shigaki et al. | 455/442 |
| 2008/0125136 A1* | 5/2008 | Song et al. | 455/452.1 |

FOREIGN PATENT DOCUMENTS

| | | |
|---|---|---|
| CN | 1878142 A | 12/2006 |
| CN | 1921444 A | 2/2007 |
| JP | 2003152630 A | 5/2003 |
| JP | 2003199144 A | 7/2003 |
| JP | 2003229894 A | 8/2003 |
| JP | 2004072379 A | 3/2004 |
| JP | 2004080421 A | 3/2004 |
| JP | 2004363679 A | 12/2004 |
| JP | 2005136773 A | 5/2005 |
| JP | 2007028638 A | 2/2007 |
| JP | 2007274042 A | 10/2007 |
| JP | 2008022135 A | 1/2008 |

OTHER PUBLICATIONS

International Search Report for PCT/JP2008/072623 mailed Mar. 24, 2009.
Japanese Office Action for JP2008-029005 issued Jan. 10, 2012.
Chinese Office Action for CN2300880125958.6 dated on Jan. 7, 2013.

* cited by examiner

*Primary Examiner* — Raymond Dean

(57) ABSTRACT

A radio scheduling apparatus in a radio communication system in which a modulation scheme is selected in accordance with radio quality includes radio quality acquisition means and scheduling means. The radio quality acquisition means acquires radio quality information indicative of radio quality for each mobile station. The scheduling means determines the degree of urgency for assigning a radio channel according to the radio quality, based on the radio quality information acquired by the radio quality acquisition means, and preferentially assigns a radio channel to a mobile station having a high degree of urgency.

7 Claims, 7 Drawing Sheets

Fig.1
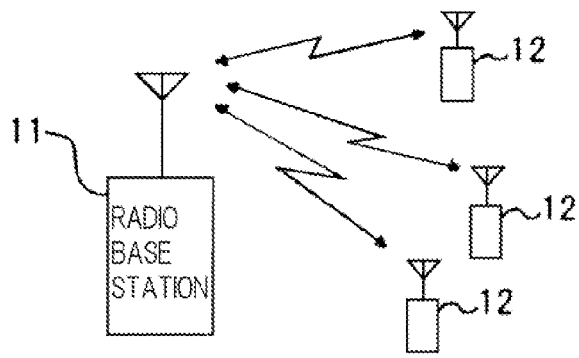
Fig.2
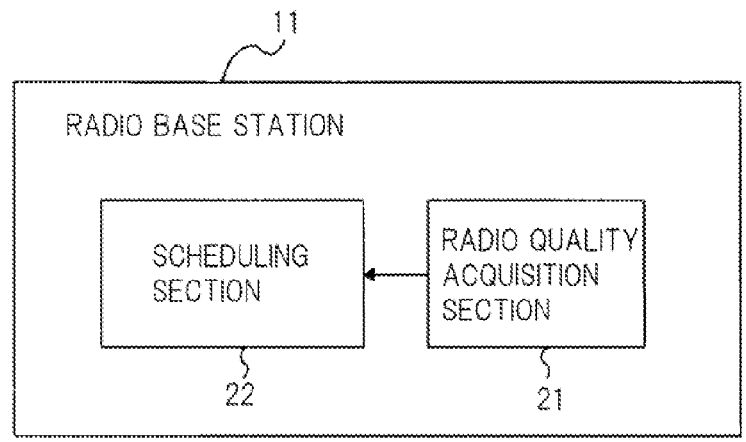
Fig.3
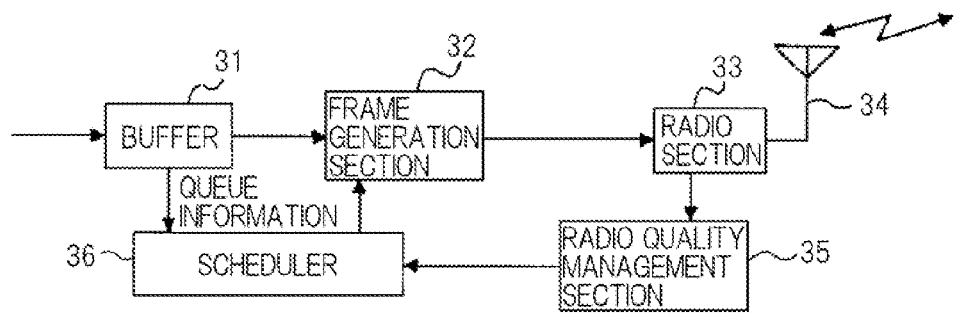
Fig.4

RADIO SCHEDULING APPARATUS, RADIO COMMUNICATION SYSTEM, AND RADIO SCHEDULING METHOD

TECHNICAL FIELD

The present invention relates to a radio scheduling technique for assigning a radio resource to a plurality of mobile stations.

BACKGROUND ART

In recent years, there has been a demand for an increase in the amount of transferable data in mobile communication. Furthermore, for mobile communication, there has been a demand to realize a multimedia sever. Thus, radio scheduling requires control such that different types of QoS (Quality of Service) are ensured for the respective services and such that the throughput of the system is maximized. Radio scheduling as described herein is to assign a radio resource for the communication between a radio base station and a plurality of mobile stations present in the area of the radio base station.

For example, IEEE 802.16-2004, which is a radio communication standard, defines UGS (Unsolicited Grant Service), rtPS (Real-time Polling Service), nrtPS (Non real-time Polling Service), and BE (Best Effort) as QoS service types. The QoS service types involve different types of requested service quality (QoS). The QoS is, for example, the quality of delay or transmission rate.

The UGS is a service for transferring data of a fixed data rate in real time. The rtPS is a service for transferring data of a variable data rate in real time. The nrtPS is a non-real-time service requiring an ensured given band. The BE is a service requiring no ensured given band.

JP2007-28638A (hereinafter referred to as "Document 1") proposes that with a variation in QoS depending on the QoS service type taken into account, data be sorted into QoS classes in accordance with requested QoS and scheduling be performed on each of the QoS classes. This scheduling needs to allow limited radio resources to be efficiently utilized while meeting the QoS request for each service.

Main known scheduling methods include a round robin method, a PF (Proportional Fairness) method, and a Maximum CINR (Carrier-to-Interference-and Noise Ratio).

The round robin method fairly assigns radio resources to the plurality of mobile stations with radio quality not taken into account. The PF (Proportional Fairness) method assigns the radio resources to the mobile stations with radio quality between the radio base station and each mobile station taken into account. The Maximum CINR (Carrier-to-Interference- and Noise Ratio) also takes radio quality into account. Examples of radio quality as described herein include the CINR and SINR (Signal to Interference and Noise Ratio).

FIG. 1 is a diagram illustrating scheduling in accordance with the round robin method. As seen in FIG. 1, the round robin method sequentially assigns radio resources to a plurality of mobile stations belonging to the same radio base station. The radio resource is fairly assigned to the respective mobile stations.

In contrast, the PF method and the Maximum CINR method perform scheduling with radio quality taken into account, thus serving to improve the system throughput compared to the round robin method. When the PF method or the Maximum CINR method is used, an AMC (Adaptive Modulation Coding) technique is also used. In the AMC, a modulation scheme or a coding rate used for each mobile station is selected in accordance with radio quality. A modulation scheme or a coding rate with a high data transmission rate is selected for a mobile station having high radio quality. A modulation scheme or a coding rate with a low data transmission rate is selected for a mobile station having low radio quality. This control allows a higher system throughput to be accomplished according to the PF method or the Maximum CINR method than according to the round robin method.

The processing in the PF method and the Maximum CINR method will be described.

First, the PF method will be described.

In the PF method, with fairness among the plurality of mobile stations taken into account, the radio resources are assigned to the mobile stations in accordance with the instantaneous radio quality of each mobile station. Here, an index for the mobile station is defined as (k). Furthermore, the instantaneous radio quality of the mobile station (k) is defined as $\gamma_k$, and the average radio quality of the mobile station (k) is defined as $\gamma_{ave,k}$.

First, Expression (1) is used to calculate the value of an evaluation function $C_k$ for each mobile station. Then, a radio resource is assigned to a mobile station having an evaluation function $C_k$ with a large value.

[Expression 1]

$$C_k = \frac{\gamma_k}{\gamma_{ave,k}} \quad (1)$$

In the PF method, a radio resource is assigned to a mobile station having high instantaneous radio quality with respect to the average radio quality. High radio quality allows the data transmission rate to be increased according to the AMC. Assigning a radio resource to a mobile station having high instantaneous radio quality means assigning a radio resource to a mobile station that has a high data transmission rate. Thus, the system throughput is improved. Furthermore, the PF method uses the instantaneous radio quality with respect to the average radio quality to maintain high fairness among the mobile stations.

Now, the Maximum CINR method will be described.

In the Maximum CINR method, a radio resource is assigned to a mobile station having a high CINR, which is indicative of instantaneous radio quality. First, Expression (2) is used to calculate the value of the evaluation function $C_k$ for each mobile station. Then, a radio resource is assigned to a mobile station having an evaluation function $C_k$ with a large value.

[Expression 2]

$$C_k = \gamma_k \quad (2)$$

In the Maximum CINR method, a radio resource is assigned to a mobile station having high instantaneous radio quality. Thus, the Maximum CINR method further improves the system throughput compared to the PF method. However, compared to the PF method, the Maximum CINR method reduces opportunities to assign a radio resource to a mobile station having low average radio quality. Hence, the PF method offers higher fairness than the Maximum CINR method.

For example, the tendency is to increase opportunities to assign a radio resource to a mobile station located near the radio base station and to offer high radio quality, while reducing opportunities to assign a radio resource to a mobile station located far from the radio base station and to offer low radio quality. As a result, a state is likely to occur in which mobile stations located farther from the radio base station are more likely to fail to maintain demanded QoS.

DISCLOSURE OF THE INVENTION

As described above, in the PF method and the Maximum CINR method, radio scheduling in which radio quality is taken into account is performed to improve the throughput of the system. However, in both methods, the control uses instantaneous radio quality obtained when radio quality is measured and fails to take the future radio quality into account. Thus, these methods fail to take a future variation in radio quality into account and thus fail to maintain the QoS or fails to assign a radio channel at the appropriate timing when the relevant mobile station is provided with high radio quality.

JP2004-363679A (Document 2) proposes a technique for predicting the future radio quality for scheduling. However, JP2004-363679A (Document 2) predicts possible degradation of the radio quality based on pre-acquired rainfall information. A variation in radio quality is caused not only by rainfall but also by various other factors. For example, fading may significantly vary the radio quality. Thus, a possible variation in radio quality may not be adequately predicted based only on rainfall information. As a result, improvement of the system throughput may be insufficient.

An object of the present invention is to provide a radio scheduling technique adapted to further improve the system throughput.

To accomplish this object, the present invention provides a radio scheduling apparatus in a radio communication system in which a modulation scheme is selected in accordance with radio quality, the radio scheduling apparatus including:

radio quality acquisition means for acquiring radio quality information indicative of the radio quality for each mobile station; and scheduling means for determining the degree of urgency for assignment of a radio channel according to the radio quality, based on the radio quality information acquired by the radio quality acquisition means, and for preferentially assigning a radio channel to a mobile station with a high degree of urgency.

An aspect of the present invention provides a radio communication system in which a modulation scheme is selected in accordance with radio quality, the communication system including:

mobile stations each configured to receive and utilize an assigned radio resource to make communication; and a radio base station configured to acquire radio quality information indicative of the radio quality for each of the mobile stations and to determine the degree of urgency for assignment of a radio channel according to the radio quality, based on the radio quality information and to preferentially assign a radio channel to a mobile station with a high degree of urgency.

An aspect of the present invention provides a radio scheduling method for a radio communication system in which a modulation scheme is selected in accordance with radio quality, the method including:

acquiring radio quality information indicative of radio quality for each mobile station;

determining the degree of urgency for assignment of a radio channel according to the radio quality, based on the radio quality information acquired; and preferentially assigning a radio channel to a mobile station with a high degree of urgency.

BRIEF DESCRIPTION OF THE DRAWINGS

FIG. 1 is a diagram illustrating scheduling based on a round robin method;

FIG. 2 is a block diagram showing the configuration of a radio communication system according to the present exemplary embodiment;

FIG. 3 is a block diagram showing the configuration of a radio base station according to the present exemplary embodiment;

FIG. 4 is a block diagram showing the configuration of radio base station 11 according to a first exemplary embodiment;

BEST MODE FOR CARRYING OUT THE INVENTION

Figure 5:
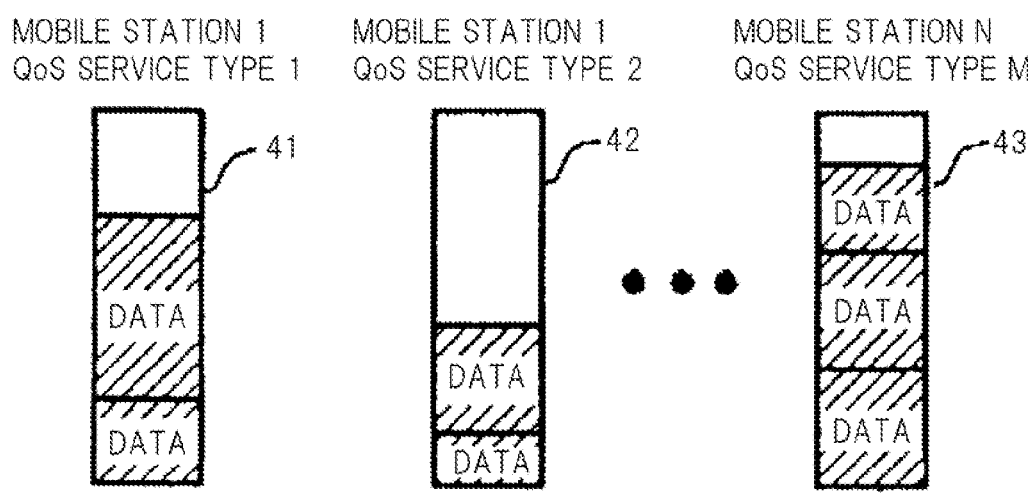
FIG. 5 is a diagram illustrating the configuration of buffer 31.

Exemplary embodiments will be described below in detail.

FIG. 2 is a block diagram showing the configuration of a radio communication system according to the present exemplary embodiment. FIG. 2 shows that the radio communication system includes radio base station 11 and mobile stations 12.

Radio base station 11 manages and assigns radio resources to mobile stations 12. In this case, radio base station 11 schedules the assignment of the radio resources to plurality of mobile stations 12.

In scheduling the assignment of radio channels, radio base station 11 assigns radio channels in accordance with radio quality. Specifically, mobile station 12 having high radio quality is given higher priority than mobile station 12 having low radio quality. In this case, radio base station 11 takes into account the degree of urgency for assignment of radio channels according to radio quality. Radio base station 11 first acquires radio quality information indicative of the radio quality for each mobile station 12. Radio base station 11 then determines the degree of urgency for assignment of radio channels according to radio quality, for each mobile station based on the radio quality information. Then, radio base station 11 preferentially assigns a radio channel to a mobile station with a high degree of urgency.

Furthermore, radio base station 11 uses a radio resource to transmit and receive data to and from mobile station 12 to which the radio resource has been assigned. This allows mobile station 12 to make communication. Mobile station 12 receives the assigned radio resource from radio base station 11, and utilizes the assigned radio resource to communicate with radio base station 11. For communication between radio base station 11 and mobile station 12, the AMC (Adaptive Modulation Coding) technique is used, and a modulation scheme or a coding rate is selected in accordance with the radio quality. A modulation scheme or coding rate with a high data transmission rate is selected for mobile station 12 that has high radio quality. A modulation scheme or coding rate with a low data transmission rate is selected for mobile station 12 that has low radio quality. The modulation scheme and the coding rate are hereinafter sometimes collectively referred to as the modulation scheme.

FIG. 3 is a block diagram showing the configuration of the radio base station according to the present embodiment. FIG. 3 shows that radio base station 11 includes radio quality acquisition section 21 and scheduling section 22.

Radio quality acquisition section 21 acquires radio quality information indicative of the radio quality for each mobile station 12. In this case, radio quality acquisition section 21 may receive, from mobile station 12, information indicative of the radio quality of a downlink measured by mobile station 12. Alternatively, radio quality acquisition section 21 may measure the radio quality of an uplink from mobile station 12 to acquire radio quality information. Examples of the radio quality include the CINR (Carrier-to-Interference-and-Noise Ratio) and the Signal to Interference and Noise Ratio.

Scheduling section 22 calculates the degree of urgency for assignment of radio channels according to radio quality, for each mobile station 12 based on the radio quality information acquired by radio quality acquisition section 21.

The degree of urgency increases if the radio quality is expected to be significantly degraded in the near future. This is because when the assignment of radio channels is delayed, the radio quality of mobile station 12 is likely to be degraded before a radio channel is assigned to mobile station 12. For example, if the current instantaneous radio quality is high and variance in the measurement result for the radio quality has a large value, the radio quality is expected to be significantly degraded in the near future. Furthermore, if the future predicted value of the radio quality is much smaller than the value of the current instantaneous radio quality, the radio quality is expected to be significantly degraded in the near future.

Moreover, scheduling section 23 performs radio scheduling such that a radio channel is preferentially assigned to mobile station 12 with a high calculated degree of urgency.

As described above, in the present embodiment, the radio quality information indicative of radio quality is acquired for each mobile station. Based on the radio quality information, the degree of urgency for assignment of radio channels according to radio quality is determined. The radio channel is preferentially assigned to a mobile station with a high degree of urgency. Thus, according to the present embodiment, a radio channel can be preferentially assigned to a mobile station with a high degree of urgency for a variation in radio quality. The present embodiment enables the system throughput to be further improved compared to the case in which only the current radio quality is used.

More specific exemplary embodiments will be described.

First Exemplary Embodiment

FIG. 4 is a block diagram showing the configuration of radio base station 11 according to a first exemplary embodiment. As shown in FIG. 4, radio base station 11 includes buffer 31, frame generation section 32, radio section 33, antenna 34, radio quality management section 35, and scheduler 36.

Buffer 31 sorts input transmitted data into QoS service types for each mobile station 12, and queues and temporarily accumulates the data.

FIG. 5 is a diagram illustrating the configuration of buffer 31. Here, the number of mobile stations 12 is defined as N. The number of QoS service types is defined as M. As shown in FIG. 5, buffer 31 forms plurality of queues 41 to 43. Data on QoS service type 1 for mobile station 1 is accumulated in queue 41. Data on QoS service type 2 for mobile station 1 is accumulated in queue 42. Data on QoS service type M for mobile station N is accumulated in queue 43.

Buffer 31 outputs transmission data saved to different queues 41 to 43, corresponding to respective QoS service types for each mobile station 12, to frame generation section 32 in accordance with instructions from frame generation section 12. Furthermore, buffer 31 outputs the status of each of queues 41 to 43 to scheduler 36 as queue information. The queue information includes, for each queue, identification information allowing the user and QoS service type corresponding to mobile station 12 to be determined, information on data length, and information on the remaining time for a delay request.

In accordance with an instruction from scheduler 36, frame generation section 32 reads data from buffer 31 and generates and outputs a transmission frame with data stored therein to radio section 33.

Radio section 33 carries out a modulation process on the transmission frame from frame generation section 32 and transmits the modulated transmission frame through antenna 34. Antenna 34 is used both for transmission and for reception. Radio section 33 receives frames from mobile station 32 via antenna 34.

Radio section 33 carries out a demodulation process on the received frame. In the demodulation process, radio section 33 acquires radio quality information from a reception signal from mobile station 32. At this time, radio section 33 measures the radio quality of reception of the signal from mobile station 32 or extracts the radio quality of the signal that has been notified by mobile station 32, from the reception signal, to acquire radio quality information. Radio section 33 then outputs the acquired radio quality information to radio quality management section 35. Here, the radio quality information includes, for example, instantaneous radio quality, average radio quality, variance in radio quality, and currently-predicted future radio quality.

An example of a method for calculating variance in radio quality, which is an example of the radio quality information, will be described. Here, for example, the CINR is used as radio quality. A time index is defined as (n), and a forgetting coefficient is defined as δ.

First, radio section 33 uses Expression (3) to calculate the average $CINR_{ave}$ of the CINR.

[Expression 3]

$$CINR_{ave}[n]=(1-\delta)CINR_{ave}[n-1]+\delta \cdot CINR[n] \quad (3)$$

Subsequently, radio section 33 uses Expression (4) to calculate the mean square $\chi^2$ of the CINR.

[Expression 4]

$$\chi^2[n]=(1-\delta)\chi^2[n-1]+\delta \cdot |CINR[n]|^2 \quad (4)$$

Moreover, radio section 33 uses Expression (5) to calculate variance $\sigma^2$ of the radio quality.

[Expression 5]

$$\sigma^2[n]=\chi^2[n]-(CINR_{ave}[n]^2) \quad (5)$$

Furthermore, an example of a method for calculating predicted, future radio quality, which is another example of radio quality information, will be described. Here, the predicted value of $CINR_{pred,s}$ of the radio quality of the sth transmission opportunity from the current one is calculated by applying, to the prediction, a Wiener filter approximate solution adapted to minimize the mean square of an estimated error.

Radio section 33 calculates predicted value $CINR_{pred,s}$ of the radio quality using Expression (6). This calculation is described in, for example, "Optimum Filtering" (Kiyoshi Nishiyama, BAIFUKAN CO., LTD., 2001) and "New Edition of Applied Karman Filter" (Toru Katayama, Asakura Publishing Co., Ltd., 2000).

[Expression 6]

$$CINR_{pred,s} = \begin{bmatrix} CINR[n] \\ CINR[n-1] \\ \vdots \\ CINR[n-m+1] \end{bmatrix}^T \begin{bmatrix} r[0] & r[-1] & \cdots & r[-(m-1)] \\ r[1] & r[0] & \cdots & r[-(m-2)] \\ \vdots & \vdots & \ddots & \vdots \\ r[m-1] & r[m-2] & \cdots & r[0] \end{bmatrix}^{-1} \begin{bmatrix} r[p] \\ r[p+1] \\ \vdots \\ r[p+m-1] \end{bmatrix} \quad (6)$$

In Expression (6), $()^T$ denotes a transposition manipulation for a matrix. (m) denotes the current number of CINR values. Here, an averaging operation is denoted as $E\{\cdot\}$. Then, the autocorrelation r[1] of the CINR in Expression (6) is calculated by:

[Expression 7]

$$r[1]=E\{CINR[n] \cdot CINR[n+1]\} \quad (7)$$

Referring back to FIG. 4, radio quality management section 35 manages the radio quality for each mobile station 12 based on radio quality information received from radio section 33. Furthermore, radio quality management section 35 notifies scheduling section 36 of managed radio quality information.

For example, in frequency division duplex (FDD), different frequency bands are used for an uplink and a downlink. Thus, different communication paths are used for transmission and reception. Hence, radio quality management section 35 may use radio quality information transmitted by mobile station 12 via the uplink, as radio quality for the downlink.

Furthermore, in time division duplex (TDD), the same frequency band is used for the uplink and the downlink. Thus, the same communication path is used for transmission and reception. Hence, on the assumption that the radio quality of the uplink is equivalent to that for the downlink, radio quality management section 35 may use the radio quality of the uplink as radio quality for the downlink.

Scheduler 36 receives queue information from buffer 31 and radio quality information from radio quality management section 15. The queue information from buffer 31 includes identification information allowing the user and QoS service type for each queue to be determined, and information on the data length of the queue.

Scheduler 36 determines the QoS requested for the data in each queue based on the QoS service type, and sorts the queues into QoS classes for the respective priorities. Scheduler 36 then schedules the QoS classes based on the queue information and radio quality information in order of decreasing priority of the QoS class. The scheduling according to the present exemplary embodiment will be described below in detail. The scheduling determines data to be stored in each transmission frame generated by frame generation section 32. Based on the results of the scheduling, scheduler 36 informs frame generation section 32 of the identification information on the data to be stored in each transmission frame and the information on the data length.

Now, the operation of scheduler 36 will be described in detail.

Figure 6:
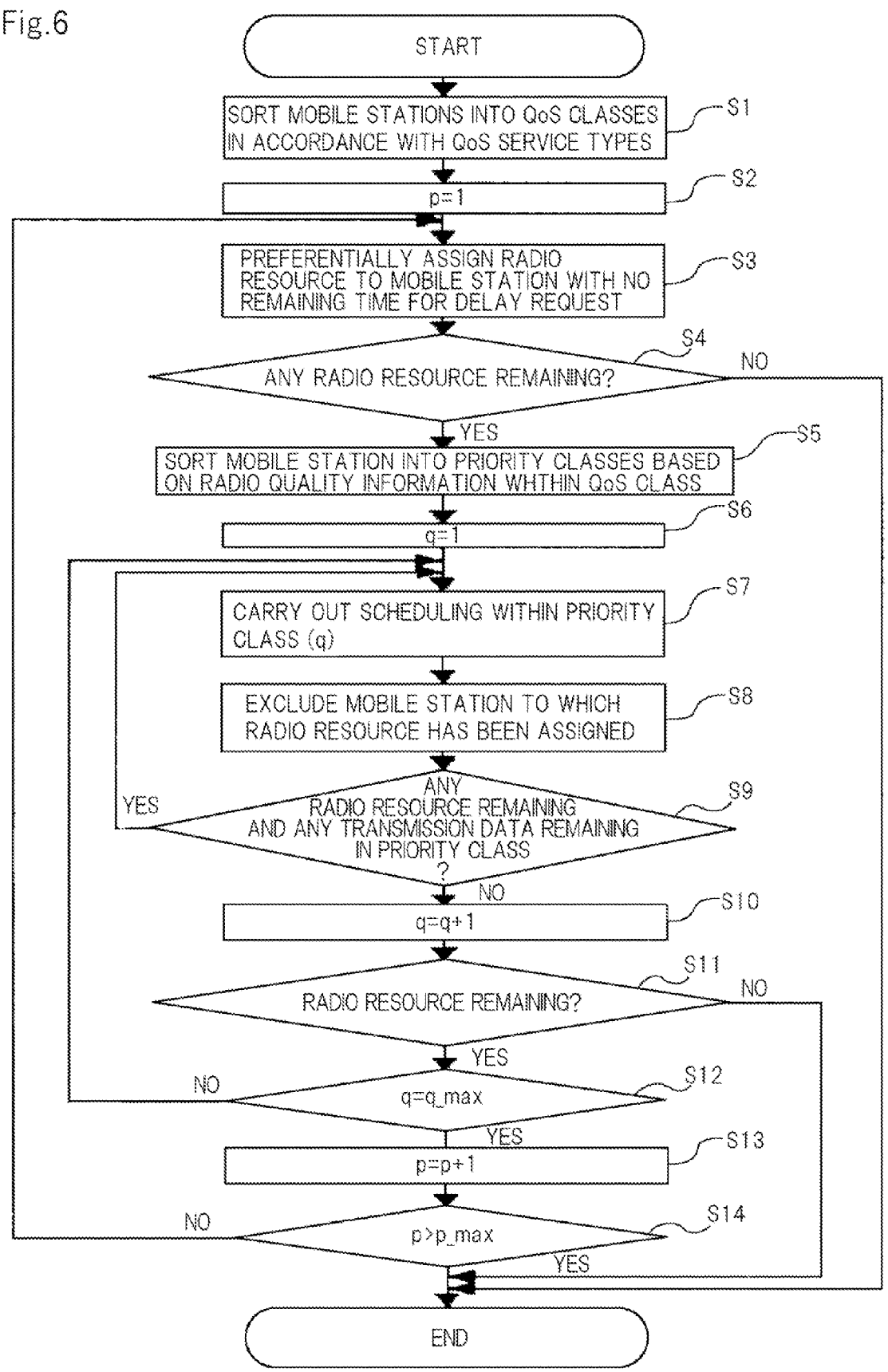
FIG. 6 is a flowchart showing the procedure of processing executed by scheduler 36 according to the first exemplary embodiment.

FIG. 6 is a flowchart showing the procedure of processing executed by scheduler 36 according to the first exemplary embodiment.

In this case, the index for the above-described QoS class is defined as (p). Numbers 1, 2, 3, . . . are added to the respective QoS classes in order of decreasing priority. The number of the QoS classes is defined as p_max.

Furthermore, scheduler 36 sorts mobile stations 12 into the priority classes in accordance with the priorities for which the future status of the radio quality is taken into account. The index for the priority class is defined as (q). Numbers 1, 2, 3, . . . are added to the respective priority classes in order of decreasing priority. The number of the priority classes is defined as q_max.

As shown in FIG. 6, in step S1, scheduler 36 determines the requested QoS based on the QoS service types and sorts the mobile stations into QoS classes. In the present exemplary embodiment, the QoS classes corresponding to the QoS service types are provided and numbered in order of decreasing strictness of the QoS request. For example, in connection with IEEE 802.16-2004, QoS classes corresponding to UGS, rtPS, nrtPS, and BE, respectively, are provided and numbered 1, 2, 3, and 4.

Then, in step S2, index (p) for the QoS class to be scheduled is initialized to "1". This determines the scheduling target to be the QoS class with index (p) of "1".

Then, in step S3, as long as there remains a radio resource, the radio resource is assigned to mobile station 12 with a short remaining time for a request for a delay time. Whether or not the remaining time for a request for a delay time is short may be determined based on, for example, a predetermined threshold.

Then, in step S4, scheduler 36 determines whether or not there remains any radio resource. If there remains no radio resource, the processing is terminated.

If there remains any radio resource, then in step S5, mobile stations 12 is sorted into the priority classes based on the radio quality information. This sorting provides mobile stations 12 with the priorities for which the future radio quality is taken into account. The present step will be described below in detail with reference to FIG. 7.

Then, in step S6, index (q) for the priority class to be scheduled is initialized to "1". This determines the scheduling target to be the priority class with index (q) of "1".

In step S7, scheduling is carried out within the QoS class and priority class to be scheduled. A radio resource is assigned to selected mobile station 12. Here, an existing method, for example, the round robin method, the PF method, or the Maximum CINR method, may be used for the scheduling. The mobile station to which the radio resource has been assigned in step S7 is excluded from the assignment of radio resources in step S8.

Moreover, in step S9, scheduler 36 determines whether or not there remains any radio resource and whether or not there remains any transmission data in the queue belonging to the target priority class. If there remains any transmission data, the processing returns to step S7. If there remains no transmission data, then in step S10, index (q) for the priority class is incremented. This process is to shift the scheduling target to the next priority class.

Subsequently, in step S11, scheduler 36 determines whether or not there remains any radio resource. If there is no radio resource, the processing is terminated.

If there remains any radio resource, then in step S12, scheduler 36 determines whether or not there remains any unscheduled priority class. This is determined depending on whether index (q) for the priority class is larger than the number q_max of the priority classes. If there remains any unscheduled priority class, the processing returns to step S7.

If there remains no unscheduled priority class, then in step S13, index (p) for the QoS class is incremented. Thus, the scheduling target shifts to the next QoS class.

Then, in step S14, scheduler 36 determines whether or not there remains any unscheduled QoS class. This is determined depending on whether index (p) for the QoS class is larger than number p_max of the QoS classes. If there remains any unscheduled QoS class, the processing returns to step S3. If there remains no unscheduled QoS class, then the processing is terminated.

Now, an example of processing in step S5 in FIG. 6 described above will be described with reference to FIG. 7. In step S5, the mobile stations are sorted into priority classes based on the radio quality information.

Figure 7:
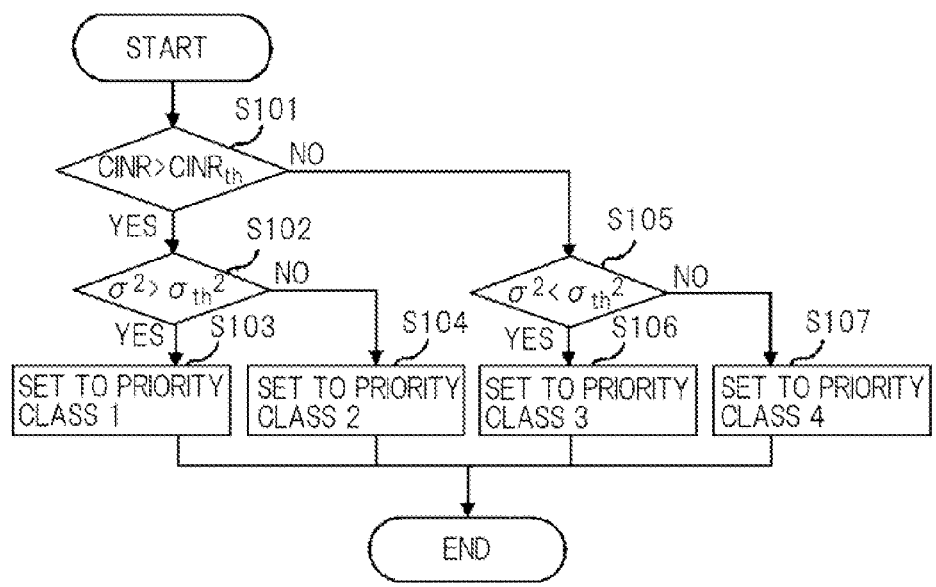
FIG. 7 is a flowchart showing an example of processing in step S5 according to the first exemplary embodiment.

As shown in FIG. 7, first, in step S101, scheduler 36 compares a threshold $CINR_{th}$ with the CINR, the instantaneous radio quality of each mobile station 12 in the QoS class to be scheduled and determines whether or not a CINR is larger than $CINR_{th}$. For example, mobile station 12 with a CINR larger than $CINR_{th}$ is sorted into a high priority class, and mobile station 12 with a CINR equal to or smaller than $CINR_{th}$ is sorted into a low priority class.

In step S102, scheduler 36 determines, for mobile stations 12 with $CINR > CINR_{th}$, whether or not variance $\sigma^2$ in radio quality is larger than threshold $\sigma_{th}^2$. In step S103, mobile station 12 with variance $\sigma^2$ in radio quality larger than threshold $\sigma_{th}^2$ is set to the highest priority class 1. In step S104, mobile station 12 with variance $\sigma^2$ in radio quality equal to or smaller than threshold $\sigma_{th}^2$ is set to the second highest priority class 2.

Figure 8:
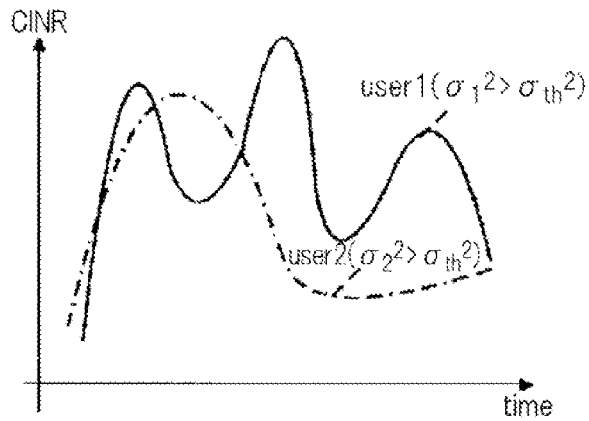
FIG. 8 is a diagram illustrating the meaning of setting of priority classes according to the first exemplary embodiment.

The meaning of this setting will be described with reference to FIG. 8. User 1 involves a significant variation in CINR, whereas user 2 involves an insignificant variation in CINR. Thus, user 1 involves variance $\sigma^2$ larger than the threshold, whereas user 2 involves variance $\sigma^2$ smaller than the threshold. The degree of variation in radio quality CINR increases consistently with variance $\sigma^2$. Thus, the radio quality, which is currently high, is likely to be degraded in the near future. Hence, a high priority may be provided to mobile station 12 having a high radio-quality CINR and large variance $\sigma^2$ so that a radio resource can be assigned to mobile station 12 before the radio quality CINR of mobile station 12 is degraded. On the other hand, the degree of variation in radio quality CINR decreases consistently with variance $\sigma^2$. Thus, if the radio quality is currently high, high radio quality is likely to be maintained in the future. Thus, a low priority may be provided to mobile station 12 having a high radio-quality CINR and small variance $\sigma^2$. As described above, variance $\sigma^2$ serves as an element that allows the degree of urgency for assignment of radio resources to be determined.

In step S105, scheduler 36 determines, for mobile station 12 with $CINR \leq CINR_{th}$, whether or not variance $\sigma_2$ in radio quality is smaller than threshold $\sigma_{th}^2$. In step S106, mobile station 12 with variance $\sigma^2$ smaller than threshold $\sigma_{th}^2$ is set to third priority class 3. In step S107, mobile station 12 with variance $\sigma^2$ in radio quality equal to or larger than threshold $\sigma_{th}^2$ is set to lowest priority class 4. This setting means that a low priority is provided to mobile station 12 having a low radio-quality CINR and large variance $\sigma^2$ to wait for the radio quality CINR of mobile station 12 to be improved later as a result of a variation.

As described above, the present exemplary embodiment uses, in addition to instantaneous radio quality, variance in radio quality as elements to decide the degree of urgency for assignment of radio resources. Thus, the mobile stations are sorted into priority classes using the priorities for which future radio quality is taken into account. A high priority is provided to a mobile station having high instantaneous radio quality and a large variance in radio quality so as to increase the possibility of assigning a radio resource to the mobile station while the radio quality of the mobile station is high. A low priority is provided to a mobile station low radio quality and a large variance in radio quality so that the radio quality of the mobile station will be improved before a radio resource is assigned to the mobile station. The present exemplary embodiment thus efficiently assigns radio resources to the mobile stations, enabling the system throughput to be further improved.

In particular, for a QoS service type involving a delay request, taking the future radio quality of a mobile station into account increases the number of opportunities to assign a radio resource to the mobile station within the requested delay time while the radio quality of the mobile station is relatively high. As a result, the system throughput can be improved with QoS maintained.

Furthermore, in the present exemplary embodiment, scheduling is performed with fairness or with instantaneous radio quality taken into account based on the order of decreasing priority. This enables scheduling to be performed with fairness or instantaneous radio quality taken into account.

In the present exemplary embodiment, QoS classes corresponding to the respective QoS service types are provided. However, the present invention is not limited to this configuration. Based on the QoS specified for each QoS service type, one QoS class may be provided to a plurality of QoS service types.

Furthermore, for the threshold for variance $\sigma^2$ in radio quality, the present exemplary embodiment uses the same value for the process executed on mobile station 12 having high instantaneous radio quality CINR (step S102) and for the process executed on mobile station 12 having low instantaneous radio quality CINR (step S105). However, the present invention is not limited to this configuration. In another example, different values may be used for these processes.

Furthermore, the present exemplary embodiment uses different thresholds for the instantaneous radio quality CINR and the variance $\sigma^2$ in radio quality, respectively, for sorting of the mobile stations into the priority classes. However, the present invention is not limited to this configuration. In another example, a plurality of thresholds may be set for each of the instantaneous radio quality CINR and the variance $\sigma^2$ in radio quality so that the values of the instantaneous radio quality CINR and the variance $\sigma^2$ in radio quality can be used to sort the mobile stations into a plurality of priority classes.

Furthermore, in the present exemplary embodiment, the threshold $CINR_{th}$ for instantaneous radio quality and the threshold $\sigma_{th}^2$ for variance in radio quality may be variable parameters. This enables an appropriate variation in the weight ratio of the priority of the current radio quality to the priority of future radio quality.

Second Exemplary Embodiment

A second exemplary embodiment will be described, mainly focusing on differences from the first exemplary embodiment.

The second exemplary embodiment uses the future predicted value of radio quality to sort mobile stations into priority classes.

Figure 9:
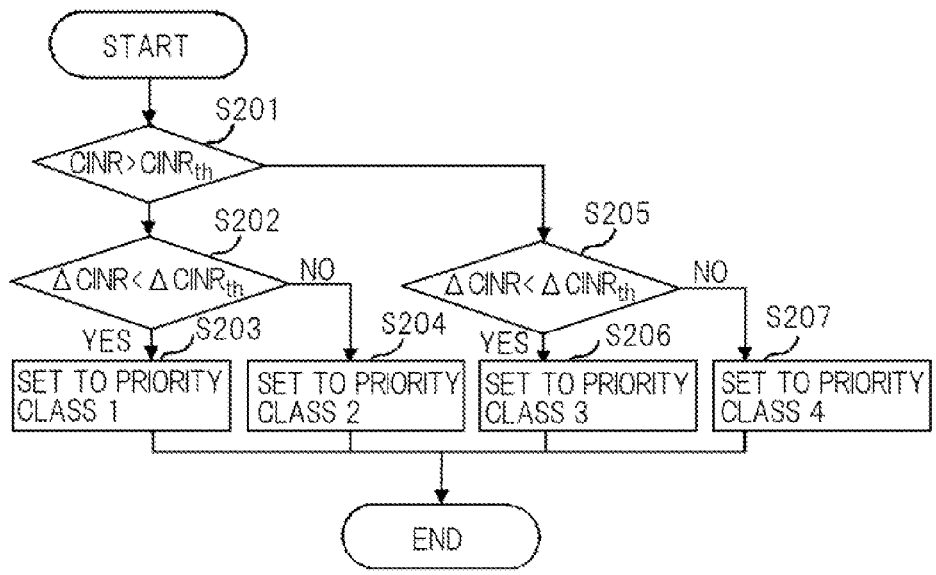
FIG. 9 is a flowchart showing an example of processing in step S5 according to a second exemplary embodiment.

FIG. 9 is a flowchart showing an example of processing in step S5 in the second exemplary embodiment. As shown in FIG. 9, first, in step S201, scheduler 36 compares the threshold $CINR_{th}$ with the CINR, that is, the instantaneous radio quality, of the QoS class to be scheduled to determine whether or not the CINR is larger than the $CINR_{th}$. A mobile station with a CINR larger than the $CINR_{th}$ is sorted into a high priority class, whereas a mobile station with a CINR equal to or smaller than the $CINR_{th}$ is sorted into a low priority class.

In step S202, for mobile station 12 with CINR>$CINR_{th}$, scheduler 36 determines whether or not the difference $\Delta CINR$ (=$CINR_{pred,s}$−CINR) between instantaneous radio quality CINR and predicted value $CINR_{pred,s}$ of the radio quality in the sth transmission opportunity from the current one is smaller than threshold $\Delta CINR_{th}$.

In step S203, mobile station 12 that determined in step S202 to have $\Delta CINR < \Delta CINR_{th}$ is set to the highest priority class 1. In step S204, mobile station 12 that determined in step S202 to have $\Delta CINR \geq \Delta CINR_{th}$ is set to second highest priority class 2. A high priority is provided to mobile station 12 with the radio quality expected to be significantly degraded so that a radio channel can be assigned to the mobile station as early as possible.

In step S205, for mobile station 12 with CINR≤$CINR_{th}$, scheduler 36 determines whether or not difference $\Delta CINR$ (=$CINR_{pred,s}$−CINR) between instantaneous radio quality CINR and predicted value $CINR_{pred,s}$ of the radio quality in the sth transmission opportunity from the current one is smaller than threshold $\Delta CINR_{th}$.

In step S206, mobile station 12 that determined in step S205 to have $\Delta CINR < \Delta CINR_{th}$ is set to third highest priority class 3. In step S207, mobile station 12 that determined in step S205 to have $\Delta CINR \geq \Delta CINR_{th}$, is set to lowest priority class 4. A high priority is provided to mobile station 12 with the radio quality expected to be significantly degraded so that a radio channel can be assigned to the mobile station as early as possible.

As described above, in addition to instantaneous radio quality, the difference between the current instantaneous value and future predicted value of the radio quality is used as elements to decide the degree of urgency for assignment of radio resources, to sort the mobile stations into the priority classes based on the priorities for which the future radio quality is taken into account.

A high priority is provided to a mobile station whose radio quality is expected to be degraded based on the difference between the current instantaneous value and the future predicted value of the radio quality, so as to increase the possibility of assigning a radio resource to the mobile station while the radio quality of the mobile station is high.

In particular, for a QoS service type involving a delay request, taking the future radio quality of a mobile station into account increases the number of opportunities to assign a radio resource to the mobile station within the requested delay time while the radio quality of the mobile station is relatively high. As a result, the system throughput can be improved with QoS maintained.

Furthermore, in connection with the threshold $\Delta CINR_{th}$ for the difference between the current instantaneous value and future predicted value of the radio quality, the present exemplary embodiment uses the same value for the process executed on mobile station 12 having high instantaneous radio quality CINR (step S202) and for the process executed on mobile station 12 with low instantaneous radio quality CINR (step S205). However, the present invention is not limited to this configuration. In another example, different values may be used for these processes.

Furthermore, the present exemplary embodiment uses different thresholds for the instantaneous radio quality CINR and the difference $\Delta CINR$ between the current instantaneous value and future predicted value of the radio quality, respectively, for sorting of the mobile stations into the priority classes. However, the present invention is not limited to this configuration. In another example, a plurality of thresholds may be set for each of instantaneous radio quality CINR and the difference $\Delta CINR$ between the current instantaneous value and future predicted value of the radio quality so that the values of instantaneous radio quality CINR and the difference $\Delta CINR$ between the current instantaneous value and future predicted value of the radio quality can be used to sort the mobile stations into a plurality of priority classes.

Furthermore, in the present exemplary embodiment, parameter (s) may be a value corresponding to the remaining time for a delay request from one of a plurality of target mobile stations which has the shortest remaining time, or may be a predetermined given value.

Additionally, in the present exemplary embodiment, the threshold $CINR_{th}$ for the instantaneous radio quality and the threshold $\Delta CINR_{th}$ for the difference between the current instantaneous value and future predicted value of the radio quality may be variable parameters. This enables an appropriate variation in the weight ratio of the priority of the current radio quality to the priority of the future radio quality.

Third Exemplary Embodiment

A third exemplary embodiment will be described, mainly focusing on differences from the first exemplary embodiment.

In the third exemplary embodiment, scheduling is performed based on an evaluation function calculated using the future predicted value of the radio quality. The evaluation function serves as an element that allows the degree of urgency for assigning radio resources to be determined.

Figure 10:
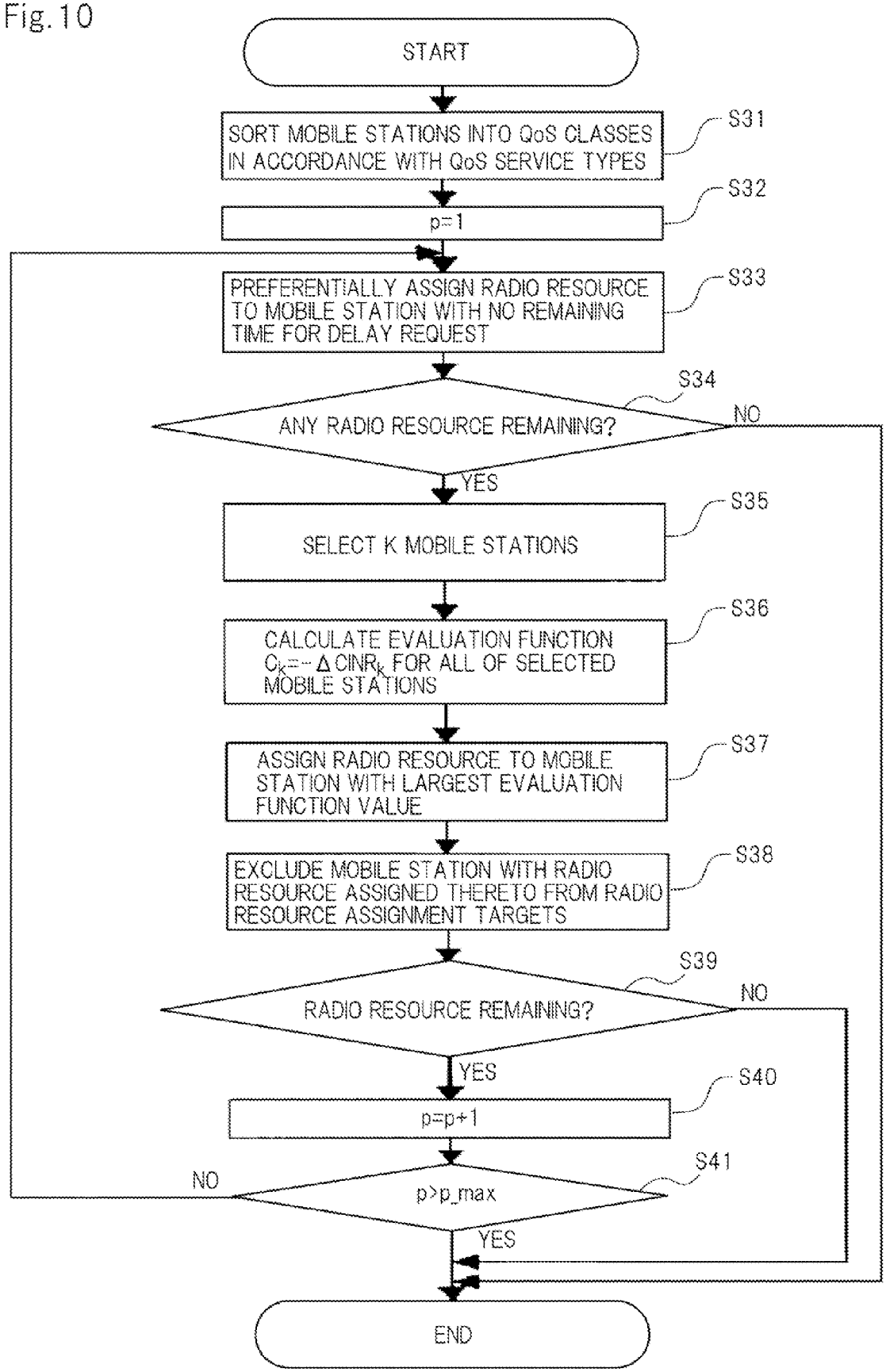
FIG. 10 is a flowchart showing the procedure of processing executed by scheduler 36 according to a third exemplary embodiment.

FIG. 10 is a flowchart showing the procedure of processing executed by scheduler 36 according to the third exemplary embodiment. As shown in FIG. 10, first, in step S31, scheduler 36 determines QoS based on QoS service types to sort mobile stations into QoS classes. In the present exemplary embodiment, QoS classes corresponding to QoS service types are provided and numbered in order of decreasing strictness of the QoS request. For example, in connection with IEEE 802.16-2004, QoS classes corresponding to UGS, rtPS, nrtPS, and BE, respectively, are provided and numbered 1, 2, 3, and 4.

Then, in step S32, index (p) for the QoS class to be scheduled is initialized to "1". This determines the scheduling target to be the QoS class with index (p) of "1".

Then, in step S33, as long as there remains a radio resource, the radio resource is assigned to mobile station 12 with a short remaining time for a request for a delay time. Whether or not the remaining time for a request for a delay time is short may be determined based on, for example, a predetermined threshold.

Then, in step S34, scheduler 36 determines whether or not there remains any radio resource. If there remains no radio resource, processing is terminated.

If there remains any radio resource, then in step S35, scheduling is carried out within the QoS class to be scheduled for assignment of radio resources, to select K mobile stations 12. Here, an existing method, for example, the round robin method, the PF method, or the Maximum CINR method may be used for the scheduling.

Subsequently, in step S36, instantaneous radio quality is defined as CINR, and the difference between current instantaneous radio quality CINR and predicted value $CINR_{pred,s}$ of the radio quality in the sth transmission opportunity from the current one is defined as $\Delta CINR_k^-$. Then, Expression (8) is used to calculate evaluation function $C_k$ for all selected K mobile stations 12.

[Expression 8]

$$C_k = -\Delta CINR_k \quad (8)$$

Evaluation function $C_k$ in Expression (8) has a larger value for mobile station 12 with the radio quality expected to be more significantly degraded in the future. Then, in step S37, one of K mobile stations 12 for which evaluation function $C_k$ has the largest value is selected. A radio resource is then assigned to this mobile station.

Figure 11:
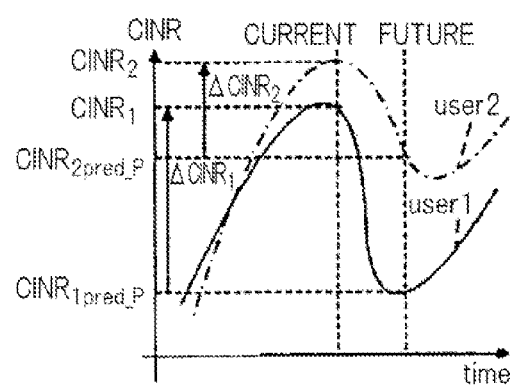
FIG. 11 is a diagram illustrating an evaluation function.

FIG. 11 is a diagram illustrating the evaluation function. As shown in FIG. 11, when mobile station 12 (user) for which evaluation function $C_k$ has the largest value is selected, a radio resource can be preferentially assigned to mobile station 12 with the current radio quality expected to be significantly degraded in the future before the radio quality is actually degraded.

Then, in step S38, mobile station 12 to which the radio resource has been assigned in step S37 is excluded from the radio resource assignment targets.

Subsequently, in step S39, scheduler 36 determines whether or not there remains any radio resource. If there remains no radio resource, processing is terminated.

If there remains any radio resource, then in step S40, index (p) for the QoS class is incremented. Thus, the scheduling target is shifted to the next QoS class.

Then, in step S41, scheduler 36 determines whether or not there remains any unscheduled QoS class. This is determined depending on whether or not index (p) for the QoS class is larger than the number p_max of the QoS classes. If there remains any unscheduled QoS class, then the processing returns to step S33. If there remains no unscheduled QoS class, processing is terminated.

As described above, the present exemplary embodiment takes the future radio quality of a mobile station into account to enable a radio resource to be assigned to the mobile station before the radio quality of the mobile station is degraded. Therefore, radio resource assignment can be efficiently accomplished.

In particular, for a QoS service type involving a delay request, taking the future radio quality of a mobile station into account increases the number of opportunities to assign a radio resource to the mobile station within the requested delay time while the radio quality of the mobile station is relatively high. As a result, the system throughput can be improved in which QoS is maintained.

In the present exemplary embodiment, the number K of mobile stations 12 one of which is to be selected may be a variable parameter. The number K may be set to an appropriate value in accordance with the number of mobile stations 12 to which radio resources are to be assigned.

In the present exemplary embodiment, a parameter (s) indicative of the transmission opportunity for which the radio quality of the mobile station will be predicted may be a variable parameter and may be preset. Alternatively, a parameter (s) may be an adaptively varying value. For example, a parameter (s) may be a value corresponding to the remaining time for a delay request from one of a plurality of radio resource assignment target mobile stations 12 which has the shortest remaining time.

Fourth Exemplary Embodiment

A fourth exemplary embodiment will be described, mainly focusing on differences from the third exemplary embodiment.

The fourth exemplary embodiment is different from the third exemplary embodiment in that in the fourth exemplary embodiment, an evaluation function is calculated for all radio resource assignment target mobile stations 12. Furthermore, the fourth exemplary embodiment involves a calculation expression for the evaluation function different from that according to the third embodiment. The evaluation function corresponds to the degree of urgency for radio resource assignment.

Figure 12:
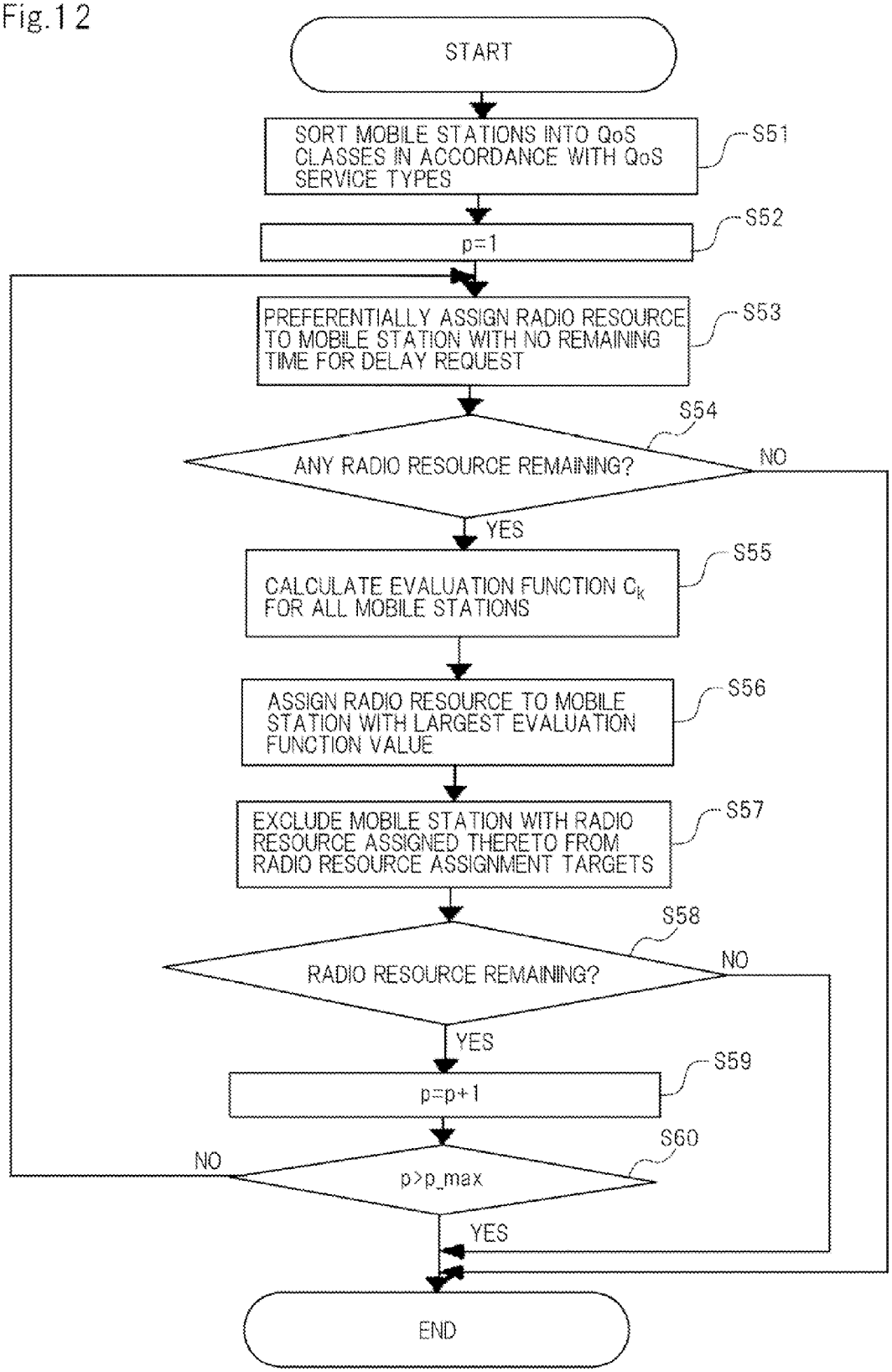
FIG. 12 is a flowchart showing the procedure of processing executed by scheduler 36 according to a fourth exemplary embodiment.

FIG. 12 is a flowchart showing the procedure of processing executed by scheduler 36 according to the fourth exemplary embodiment. As shown in FIG. 12, first, in step S51, scheduler 36 determines QoS based on QoS service types to sort mobile stations into QoS classes. In the present exemplary embodiment, QoS classes corresponding to QoS service types are provided and numbered in order of decreasing strictness of the QoS request. For example, in connection with IEEE 802.16-2004, QoS classes corresponding to UGS, rtPS, nrtPS, and BE, respectively, are provided and numbered 1, 2, 3, and 4.

Then, in step S52, index (p) for the QoS class to be scheduled is initialized to "1". This determines the scheduling target to be the QoS class with index (p) of "1".

Then, in step S53, as long as there remains a radio resource, the radio resource is assigned to mobile station 12 with a short remaining time for a request for a delay time. Whether or not the remaining time for a request for a delay time is short may be determined based on, for example, a predetermined threshold.

Then, in step S54, scheduler 36 determines whether or not there remains any radio resource. If there remains no radio resource, processing is terminated.

If there remains any radio resource, then in step S55, evaluation function $C_k$ is calculated for all QoS classes to undergo scheduling in which radio resources are assigned to the mobile stations. In this case, the instantaneous radio quality of mobile station (k) is defined as $CINR_k$, and the predicted value of radio quality in the sth transmission opportunity from the current one is defined as $CINR_{pred,s}$. Then, Expression (9) is used to calculate evaluation function $C_k$.

[Expression 9]

$$C_k = \frac{CINR_k^u}{CINR_{pred,k,s}} \quad (9)$$

In Expression 9, (u) is a parameter and denotes a positive number. In the scheduling the level of emphasis placed on instantaneous radio quality CINR increases consistently with the value of (u). In contrast, the scheduling places consistently more emphasis on the predicted value of the radio quality as the value of (u) decreases.

Furthermore, evaluation function $C_k$ in Expression (9) has a larger value when the value of instantaneous radio quality CINR increases or when the value of the expected radio quality decreases.

Then, in step S56, mobile station 12, for which evaluation function $C_k$ has the largest value, is selected, and a radio resource is assigned to this mobile station 12. When mobile station 12 for which evaluation function $C_k$ has the largest value, is selected, a radio resource can be preferentially assigned to mobile station 12 with the current radio quality expected to be significantly degraded in the future before the radio quality is actually degraded.

Then, in step S57, mobile station 12, to which the radio resource has been assigned in step S56, is excluded from the radio resource assignment targets.

Subsequently, in step S58, scheduler 36 determines whether or not there remains any radio resource. If there remains no radio resource, processing is terminated.

If there remains any radio resource, then in step S59, index (p) for the QoS class is incremented. Thus, the scheduling target is shifted to the next QoS class.

Then, in step S60, scheduler 36 determines whether or not there remains any unscheduled QoS class. This is determined depending on whether or not index (p) for the QoS class is larger than the number p_max of the QoS classes. If there remains any unscheduled QoS class, then processing returns to step S53. If there remains no unscheduled QoS class, processing is terminated.

As described above, the present exemplary embodiment takes the future radio quality of a mobile station into account to enable a radio resource to be assigned to the mobile station before the radio quality of the mobile station is degraded. Therefore, radio resource assignment can be efficiently accomplished.

In particular, for a QoS service type involving a delay request, taking the future radio quality of a mobile station into account increases the number of opportunities to assign a radio resource to the mobile station within the requested delay time while the radio quality of the mobile station is relatively high. As a result, the system throughput can be improved in which QoS maintained.

Furthermore, in the present exemplary embodiment, a parameter (s) indicative of the transmission opportunity for which the radio quality of the mobile station is predicted may be a variable parameter and may be preset. Alternatively, a parameter (s) may be an adaptively varying value. For example, a parameter (s) may be a value corresponding to the remaining time for a delay request from one of a plurality of radio resource assignment target mobile stations 12 which has the shortest remaining time.

The present invention has been described with reference to the exemplary embodiments. However, the present invention is not limited to the exemplary embodiments. Various changes understandable to those skilled in the art may be made to the configurations and details of the present invention defined in the claims within the scope of the present invention.

The present application is the National Phase of PCT/JP2008/072623, filed Dec. 12, 2008, which claims the benefit of the priority based on Japanese Patent Application No. 2008-029005 filed on Feb. 8, 2008. The entirety of the disclosure of Japanese Patent Application No. 2008-029005 is incorporated herein by reference.

The invention claimed is:

1. A radio scheduling apparatus in a radio communication system in which a modulation scheme is selected in accordance with radio quality, the radio scheduling apparatus comprising:
a radio quality acquisition section that acquires radio quality information indicative of radio quality for each mobile station; and
a scheduling section that determines the degree of urgency for assigning a radio channel according to the radio quality, based on the radio quality information acquired by the radio quality acquisition section, and preferably assigns a radio channel to a mobile station having a high degree of urgency;
wherein when an index for the mobile station is defined as (k), the predicted value of the radio quality is defined as $\gamma_{pred,k}$, and the instantaneous radio quality is defined as $\gamma k$, the scheduling section uses a predetermined parameter (u) to calculate an evaluation function:

$$C_k = \frac{\gamma_k^u}{\gamma_{pred,k}} \quad \text{[Expression 1]}$$

and assigns a radio resource to a mobile station having the largest evaluation function value.

2. The radio scheduling apparatus according to claim 1, wherein when a time index is defined as (n), the instantaneous radio quality is defined as $\gamma$, an averaging calculation is defined as $E\{\cdot\}$, and an autocorrelation of the instantaneous value of the radio quality is defined as:

$$r[l] = E\{\gamma[n] \cdot \gamma[n+1]\} \quad \text{[Expression 2]}$$

a transposition manipulation is defined as $(\ )^T$ and when the number of instantaneous values of the radio quality is defined as (m), the scheduling section uses, as the future predicted value of the radio quality, the predicted value $\gamma_{pred,s}$ of the radio quality in an sth transmission opportunity from a current transmission opportunity whose value is calculated by:

$$\gamma_{pred,s} = \begin{bmatrix} \gamma[n] \\ \gamma[n-1] \\ \vdots \\ \gamma[n-m+1] \end{bmatrix}^T \begin{bmatrix} r[0] & r[-1] & \cdots & r[-(m-1)] \\ r[1] & r[0] & \cdots & r[-(m-2)] \\ \vdots & \vdots & \ddots & \vdots \\ r[m-1] & r[m-2] & \cdots & r[0] \end{bmatrix}^{-1} \begin{bmatrix} r[s] \\ r[s+1] \\ \vdots \\ r[s+m-1] \end{bmatrix}. \quad \text{[Expression 3]}$$

3. A radio scheduling method for a radio communication system in which a modulation scheme is selected in accordance with radio quality, the radio scheduling method comprising:
- a radio quality acquisition step for acquiring radio quality information indicative of radio quality for each mobile station;
- a scheduling step for determining the degree of urgency for assigning of a radio channel according to the radio quality, based on the radio quality information acquired; and preferentially assigning a radio channel to a mobile station having a high degree of urgency;
- wherein when an index for the mobile station is defined as (k), the predicted value of the radio quality is defined as $\gamma_{pred,k}$, and the instantaneous radio quality is defined as $\gamma k$, the scheduling step uses a predetermined parameter (u) to calculate an evaluation function:

$$C_k = \frac{\gamma_k^u}{\gamma_{pred,k}} \qquad \text{[Expression 4]}$$

and assigns a radio resource to a mobile station having the largest evaluation function value.

4. The radio scheduling apparatus according to claim 1, wherein when a time index is defined as (n), the instantaneous radio quality is defined as $\gamma$, an averaging calculation is defined as $E\{\cdot\}$, and an autocorrelation of the instantaneous value of the radio quality is defined as:

$$r[l] = E\{\gamma[n]\cdot\gamma[n+1]\} \qquad \text{[Expression 5]}$$

a transposition manipulation is defined as $(\ )^T$ and when the number of instantaneous values of the radio quality is defined as (m), the scheduling section uses, as the future predicted value of the radio quality, the predicted value $\gamma_{pred,s}$ of the radio quality in an sth transmission opportunity from a current transmission opportunity whose value is calculated by:

$$\gamma_{pred,s} = \begin{bmatrix} \gamma[n] \\ \gamma[n-1] \\ \vdots \\ \gamma[n-m+1] \end{bmatrix}^T \begin{bmatrix} r[0] & r[-1] & \cdots & r[-(m-1)] \\ r[1] & r[0] & \cdots & r[-(m-2)] \\ \vdots & \vdots & \ddots & \vdots \\ r[m-1] & r[m-2] & \cdots & r[0] \end{bmatrix}^{-1} \begin{bmatrix} r[s] \\ r[s+1] \\ \vdots \\ r[s+m-1] \end{bmatrix}. \qquad \text{[Expression 6]}$$

5. The radio scheduling method according to claim 3, wherein the scheduling step sorts the mobile stations into a plurality of priority classes provided with priorities specified with the degree of urgency taken into account, and scheduling is carried out on each priority class in order of decreasing degree of urgency.

6. The radio scheduling method according to claim 3, wherein the scheduling step selects a plurality of mobile stations based on the radio quality information, further selects a mobile station from the selected plurality of mobile stations based on the degree of urgency, and assigns a radio resource to the selected mobile station.

7. The radio scheduling method according to claim 3, wherein as long as there remains a radio resource, the scheduling step gives top priority to assigning of the radio resource to a mobile station with data indicating that a value of a remaining time for a delay request is smaller than a predetermined value.

* * * * *